United States Patent
Huang (10) Patent No.: US 7,017,936 B2
(45) Date of Patent: Mar. 28, 2006

(54) ADJUSTABLE HANDLE ASSEMBLY FOR STROLLER OR TOY STROLLER

(76) Inventor: Ming-Tai Huang, 4th Floor, No. 302, Cheng Teh Road, Sec. 7, Taipei (TW)

( * ) Notice: Subject to any disclaimer, the term of this patent is extended or adjusted under 35 U.S.C. 154(b) by 79 days.

(21) Appl. No.: 10/914,319

(22) Filed: Aug. 9, 2004

(65) Prior Publication Data

US 2006/0027984 A1    Feb. 9, 2006

(51) Int. Cl.
*B62B 11/00* (2006.01)

(52) U.S. Cl. ............. 280/642; 280/47.371; 280/644; 280/654; 280/655; 280/47.38; 280/47.39; 280/65

(58) Field of Classification Search ......... 280/642, 280/644, 654, 655, 47.371, 47.38, 47.39, 280/47.4, 47.41, 65, 647; 16/115
See application file for complete search history.

(56) References Cited

U.S. PATENT DOCUMENTS

| | | | |
|---|---|---|---|
| 3,796,439 A * | 3/1974 | Perego | 280/644 |
| 4,191,397 A * | 3/1980 | Kassai | 280/647 |
| 4,272,100 A * | 6/1981 | Kassai | 280/650 |
| 4,449,732 A * | 5/1984 | Surot | 280/644 |
| 5,244,225 A * | 9/1993 | Frycek | 280/304.1 |
| D359,713 S * | 6/1995 | Leberfinger | D12/129 |
| 5,625,923 A | 5/1997 | Huang | |
| 5,863,061 A * | 1/1999 | Ziegler et al. | 280/642 |
| 6,220,621 B1 * | 4/2001 | Newton | 280/650 |
| 2002/0074774 A1 | 6/2002 | Hsu et al. | |

FOREIGN PATENT DOCUMENTS

| | | |
|---|---|---|
| DE | 20010856 | 10/2000 |
| GB | 2333269 | 7/1999 |

* cited by examiner

*Primary Examiner*—Christopher P. Ellis
*Assistant Examiner*—Cynthia F. Collado
(74) *Attorney, Agent, or Firm*—Alan D. Kamrath; Nikolai & Mersereau, P.A.

(57) ABSTRACT

A handle assembly is coupled with each of two handle-coupling rods (3) of a stroller or a top stroller. The handle assembly includes a handle (1) and a connecting tube (2). The connecting tube (2) includes an upper end (21) received in the handle (1) and a lower end that receives an upper end of an associated handle-coupling rod. When a button (15) mounted to the handle (1) is pressed, the handle (1) can be turned relative to the connecting tube (2) to a desired orientation. Further, when the button is pressed, the handle and the connecting tube can be jointly moved along a longitudinal direction of the connecting tube, thereby adjusting a level of the handle.

5 Claims, 10 Drawing Sheets

ADJUSTABLE HANDLE ASSEMBLY FOR STROLLER OR TOY STROLLER

BACKGROUND OF THE INVENTION

1. Field of the Invention

The present invention relates to a handle assembly for a stroller or a toy stroller.

2. Description of the Related Art

A stroller or toy stroller includes two handles for user's grip. However, the handles are fixed and thus could not be adjusted in length according to the height of the user. Also, the orientation of the handles could not be adjusted.

SUMMARY OF THE INVENTION

An objective of the present invention is to provide a handle assembly for a stroller or a toy stroller, wherein the handle of the handle assembly can be adjusted in length and can be turned to change its orientation.

In accordance with an aspect of the present invention, a handle assembly is coupled with each of two handle-coupling rods of a stroller or a toy stroller. Each handle-coupling rod comprises an upper end including at least two vertically spaced transverse positioning holes.

The handle assembly comprises a connecting tube having a lower end that receives an associated handle-coupling rod, allowing the connecting tube to move relative to the associated handle-coupling rod along a longitudinal direction of the connecting tube. The connecting tube includes a longitudinal hole and at least two radial grooves defined in an upper inner periphery delimiting the longitudinal hole.

The handle assembly further comprises a handle. A compartment is defined in a first end of the handle and a handgrip is formed on a second end of the handle. A hole is defined in an upper end wall delimiting the compartment. At least two radial grooves are defined in an inner periphery delimiting the hole. The handle further includes a transverse groove communicated with the hole. A button is pivotally received in the transverse groove. An upper end of the connecting tube is received in the compartment of the handle.

A clutch block is received in the upper end of the longitudinal hole of the connecting tube. The clutch block includes at least two radial extensions extending from an outer periphery thereof. The clutch block further includes a longitudinal hole.

A first elastic element is mounted in the upper end of the connecting tube for biasing the clutch block to a position where the radial extensions of the clutch block are partially received in the radial grooves of the handle and partially received in the radial grooves of the connecting tube, allowing joint longitudinal movement of the connecting tube and the handle. A tappet extends through the longitudinal hole of the clutch block. The tappet includes an upper end abutting against the button and a lower end.

A main block is mounted in the upper end of the associated handle-coupling rod. The main block includes an upper longitudinal hole, a transverse hole below the upper longitudinal hole and communicated with the upper longitudinal hole, a lower longitudinal hole not aligned with the upper longitudinal hole, and a compartment between the lower longitudinal hole and the transverse hole. A positioning member is slidably received in the transverse hole. The positioning member includes an inclined transverse through-hole.

A sliding block is slidably received in the compartment of the main block. The sliding block includes an inclined resilient extension rod extending through the inclined transverse through-hole of the positioning member into the upper longitudinal hole of the main block. The lower end of the tappet extends into the upper longitudinal hole of the main block and abuts against the inclined resilient extension rod.

A second elastic element is mounted in the lower longitudinal hole of the main block for biasing the sliding block to a position that urges an end of the positioning member into one of the transverse positioning holes of the associated handle-coupling rod.

When the button is pressed, the clutch block slides longitudinally such that the radial extensions of the clutch block are disengaged from the radial grooves of the handle to allow the handle to turn relative to the connecting tube to a desired orientation. Further, when the button is pressed, the inclined resilient extension rod is pressed downward and inward to cause the sliding block to slide downward and to cause the end of the positioning member to disengage from the transverse positioning holes, allowing the handle, the connecting tube, and the main block to move along the longitudinal direction of the connecting tube.

The upper end of each coupling—coupling rod includes a pair of aligned longitudinal slots. A pin transversely extends through the connecting tube and the longitudinal slots for guiding longitudinal movement of the tubular tube. The main block includes a transverse hole through which the pin extends, allowing joint longitudinal movement of the main block and the connecting tube.

The connecting tube includes an inner flange through which the tappet extends. The inner flange includes a necked portion. The first elastic element includes a lower end abutting against the necked portion and an upper end abutting against an end wall of the clutch block.

An end cap is attached to a lower end of the main block. The second elastic element includes an upper end abutting against the sliding block and a lower end abutting against the end cap.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
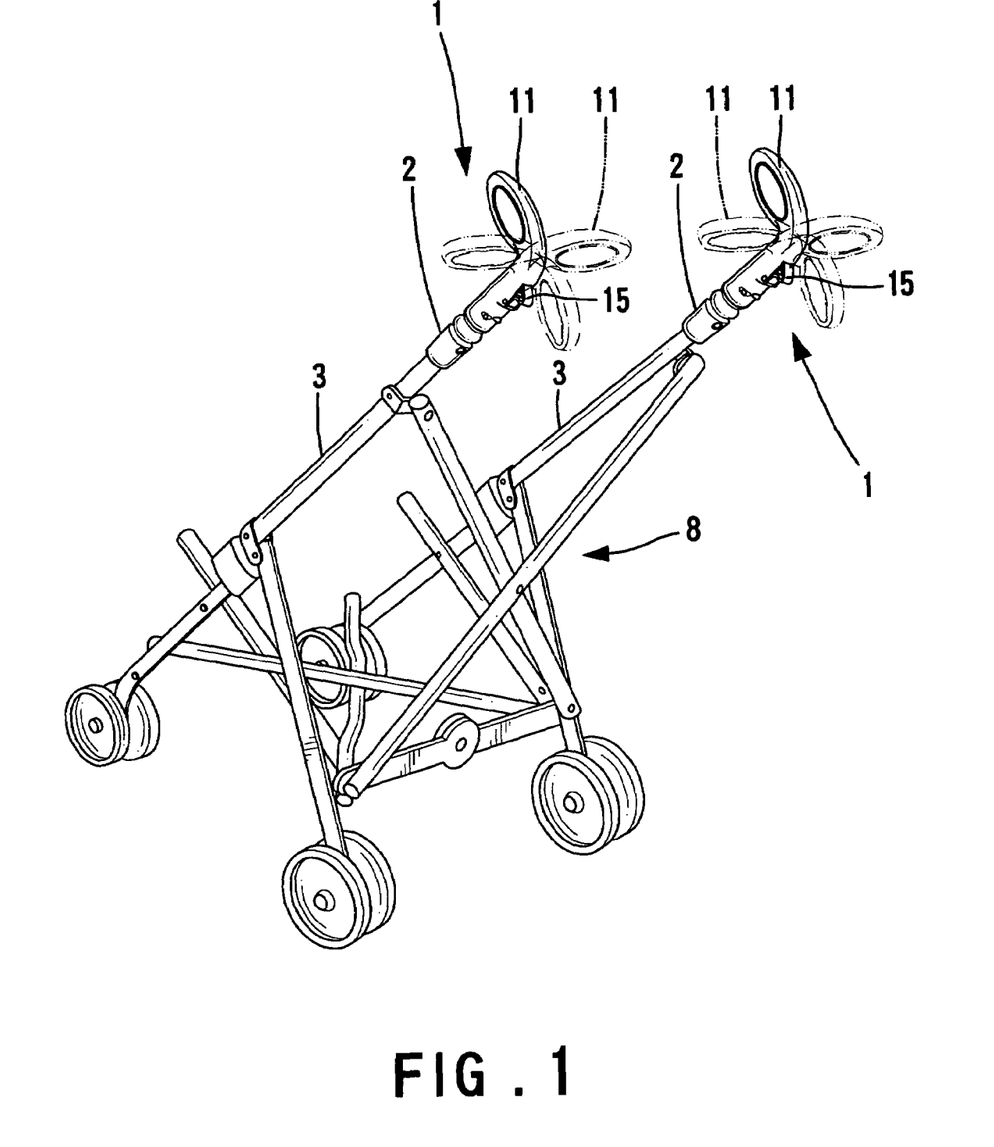
FIG. 1 is a perspective view of a stroller with a pair of handle assemblies in accordance with the present invention.
Figure 2:
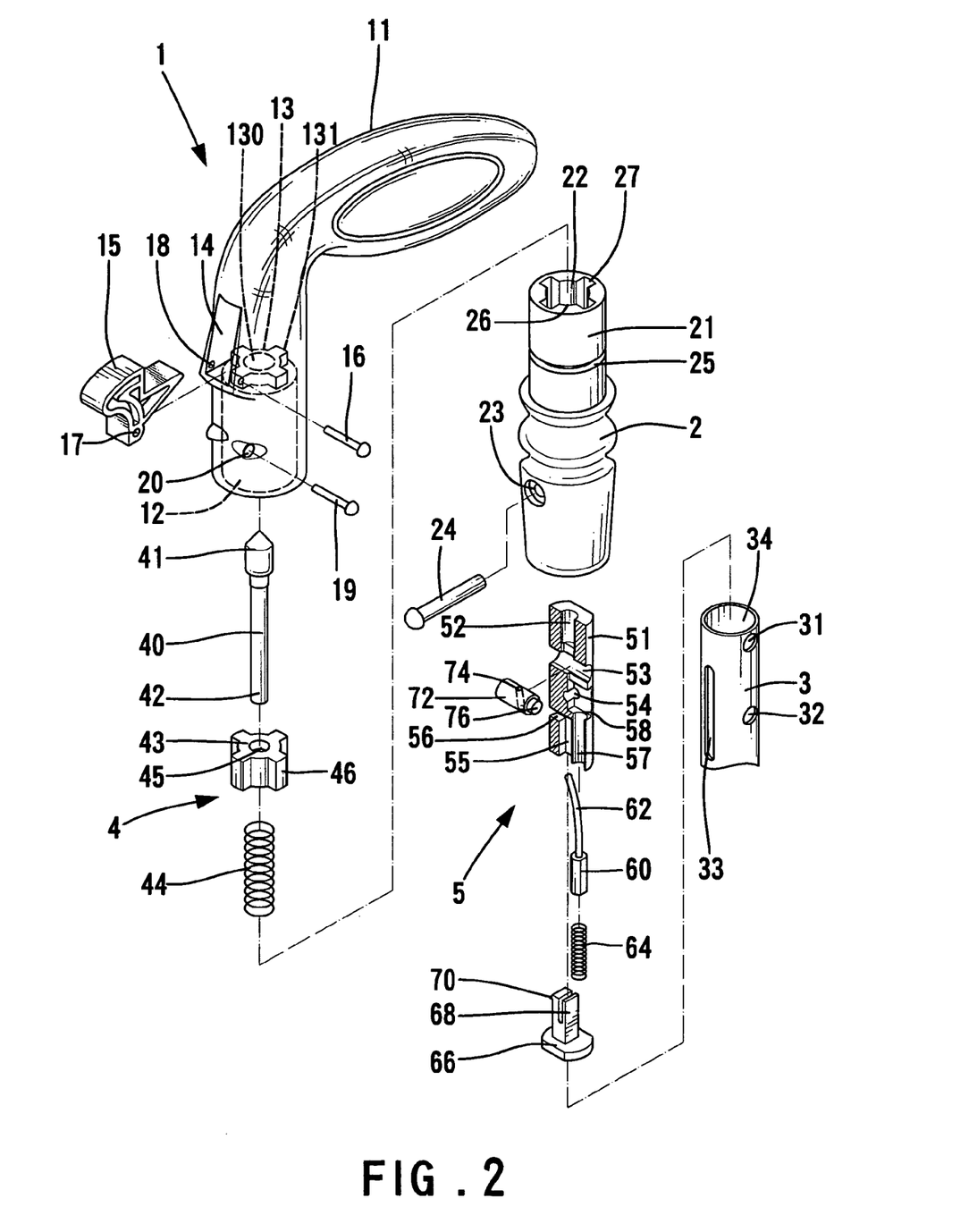
FIG. 2 is an exploded perspective view of the handle assembly in accordance with the present invention.
Figure 3:
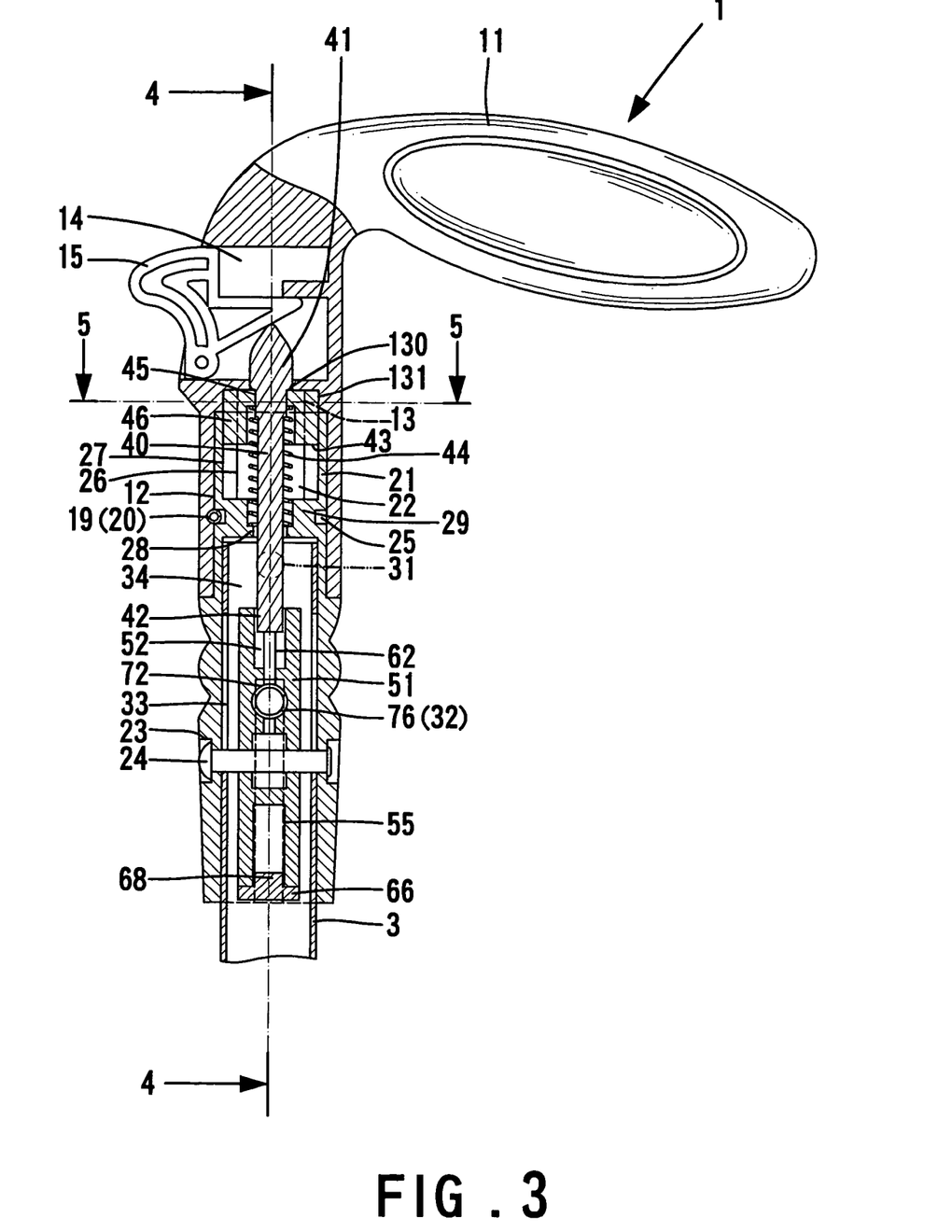
FIG. 3 is a sectional view of the handle assembly in accordance with the present invention.

FIG. 1 illustrates a stroller 8 with two handle-coupling rods 9, and a handle assembly is mounted to each handle-coupling rod 3. Still referring to FIG. 1 and further to FIGS. 2 through 4, each handle assembly in accordance with the present invention comprises a handle 1 and a connecting tube 2. The handle 1 includes a compartment 12 in a first end thereof, with a cruciform groove 13 being defined in an upper end wall delimiting the compartment 12. The cruciform groove 13 can be deemed as a hole defined in the upper end wall delimiting the compartment 12 plus four radial grooves 131 defined in an inner periphery delimiting the hole 130. The first end of the handle 1 further includes a transverse groove 14 communicated with the cruciform groove 13. A button 15 is pivotally mounted in the transverse groove 14. A rivet or pin 16 is extended through pin holes 18 in the handle 1 and a pin hole 17 in the button 15. A portion of the button 15 is preferably located outside the handle 1 to allow easy press of the button 15, as shown in FIG. 3. The handle 1 further includes a handgrip 11 formed on a second end thereof for user's grip.

The connecting tube 2 includes a longitudinal hole 26 having a cruciform section 22 in an upper end 21 of the connecting tube 2. Namely, four radial grooves 27 are defined in an inner periphery delimiting the upper end of the longitudinal hole 26. The upper end 21 of the connecting tube 2 includes an annular groove 25 in an outer periphery thereof. The connecting tube 2 further includes a transverse through-hole 23. The handle-coupling rod 3 includes a longitudinal hole 34. Further, the handle-coupling rod 3 includes at least two vertically spaced transverse positioning holes 31 and 32 (two in this embodiment) and a pair of aligned longitudinal slot 33 in an outer periphery of an upper end of the handle-coupling rod 3. The upper end of the handle-coupling rod 3 is received in a lower end of the connecting tube 2. A rivet or pin 24 is extended through the transverse through-hole 23 of the connecting tube 2 and the longitudinal slots 33 of the handle-coupling rod 3. Thus, the connecting tube 2 is slidable relative to the handle-coupling rod 3 while the pin 24 is sliding along the longitudinal holes 33 without the risk of disengaging from the handle-coupling rod 3.

The upper end 21 of the connecting tube 2 is received in the compartment 12 of the handle 1. A rivet or pin 19 is extended through a hole 20 in the handle 1 and through the annular groove 25. The pin 19 has a diameter equal to the width of the annular groove 25, as shown in FIG. 3. Thus, when the handle 1 is moved along a longitudinal direction of the connecting tube 2, the connecting tube 2 is also moved longitudinally. Nevertheless, the pin 19 allows the handle 1 to turn relative to the connecting tube 2.

Figure 4:
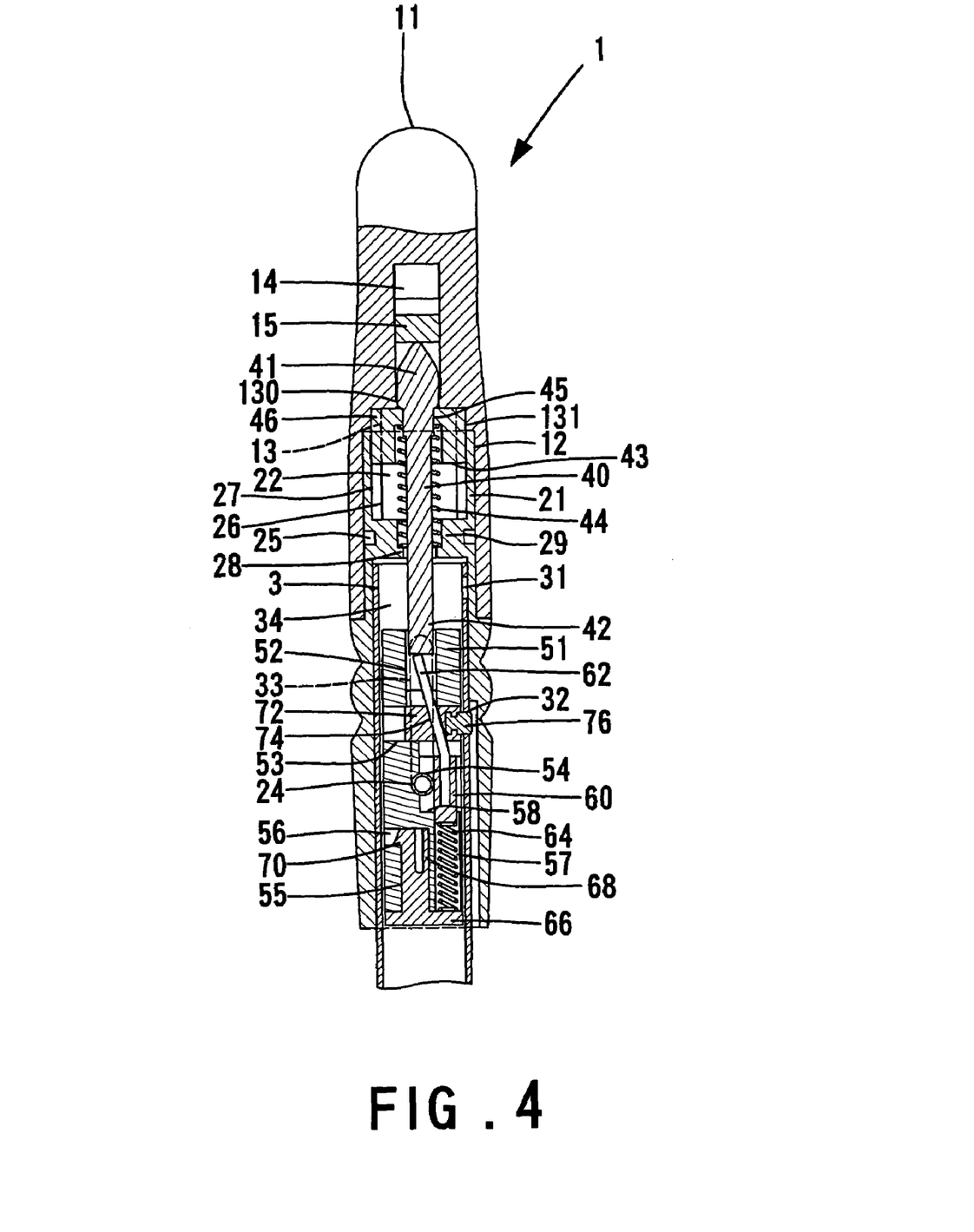
FIG. 4 is a sectional view taken along line 4—4 in FIG. 3.
Figure 5:
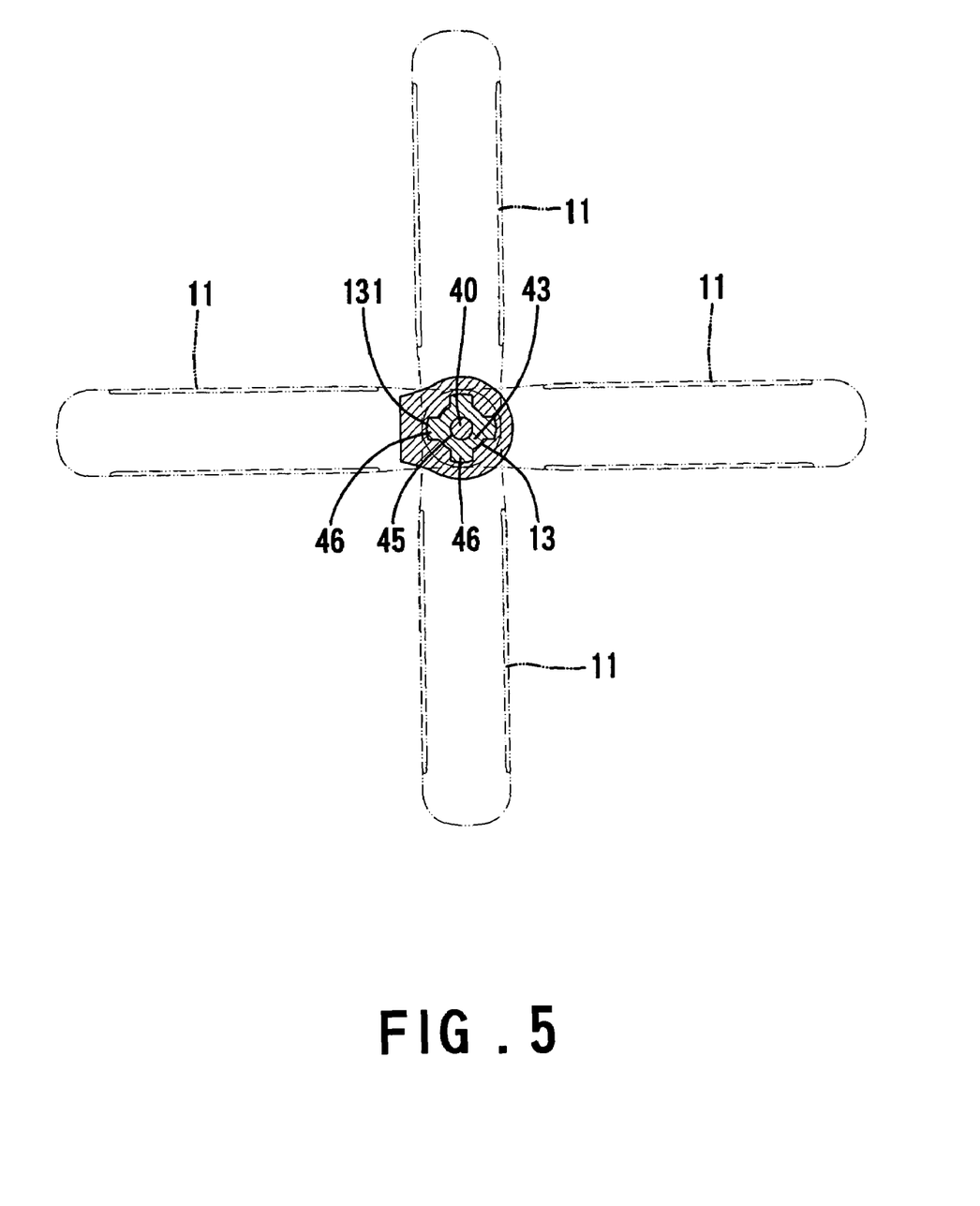
FIG. 5 is a sectional view taken along line 5—5 in FIG. 3.

The handle assembly further includes a clutch device 4. The clutch device 4 includes a clutch block 43, a tappet 40, and an elastic element 44. As illustrated in FIGS. 3 and 4, the clutch block 43 includes a longitudinal hole 46 and four radial ribs or extensions 46 extending from an outer periphery thereof. The clutch block 43 is partially received in the cruciform groove 13 of the handle 1 and partially received in the cruciform section 22 of the connecting tube 2 under the action of the elastic element 44, allowing joint movement of the handle 1 and the connecting tube 2 (see FIG. 5).

The connecting tube 2 includes an inner flange 29 (FIG. 3) on an inner periphery thereof. The tappet 40 is extended through the inner flange 29 and the longitudinal hole 45 of the clutch block 43, with an enlarged upper end 41 of the tappet 40 extending into the transverse groove 14 of the handle 1 and abutting against an inner side of the button 15. The enlarged upper end 41 of the tappet 40 has a maximum width or diameter greater than a diameter of the longitudinal hole 45 of the clutch block 43. The inner flange 29 includes a necked portion 28. The elastic element 44 is mounted around the tappet 40 and includes an upper end abutting against an upper end wall of the clutch block 43 and a lower end abutting against the necked portion 28. The clutch block 43 is biased by the elastic element 44 to be a position partially received in the cruciform groove 13 of the handle 1 and partially received in the cruciform section 22 of the longitudinal hole 26 of the connecting tube 2, allowing joint movement of the connecting tube 2 and the handle 1. Further, the enlarged upper end 41 of the tappet 40 is pushed by the clutch block 43 to a position abutting against the inner side of the button 15.

The handle assembly further comprises a positioning device 5 mounted in the connecting tube 2 and the handle-coupling rod 3. Still referring to FIGS. 2 through 4, the positioning device 5 comprises a main block 51 including an upper longitudinal hole 52, a transverse hole 53 below and communicated with the upper longitudinal hole 52, a lower longitudinal hole 57 not aligned with the upper longitudinal hole 52, and a compartment 58 between the lower longitudinal hole 57 and the transverse hole 53.

The positioning device 5 further includes a positioning member 72 slidably received in the transverse hole 53. The positioning member 72 includes an inclined transverse through-hole 74. A sliding block 60 is slidably received in the compartment 58 and includes an inclined resilient extension rod 62 extending through the inclined transverse through-hole 74 into the upper longitudinal hole 52 of the main block 51. A lower end 42 of the tappet 40 extends into the upper longitudinal hole 52 of the main block 51 and abuts against a distal end of the inclined resilient extension rod 62. The pin 24 is extended through a transverse hole 54 in the main block 51 to allow joint longitudinal movement of the main block 51 and the connecting tube 2.

An end cap 66 is attached to a lower end of the main block 2 and includes a stem 68 received in a lower compartment 55 of the main block 57. Preferably, the end cap 66 includes a resilient hook member 70 extending through a transverse positioning hole 56 in the main block 51 to securely retain the end cap 66 in place. An elastic element 64 is received in the lower longitudinal hole 57 of the main block 51 and includes an upper end abutting against the sliding block 60 and a lower end abutting against the end cap 66.

The positioning member 72 is biased by the elastic element 64 and the inclined resilient extension rod 62 to a position where an end 76 of the positioning member 72 extends into, e.g., the lower transverse positioning hole 32 of the handle-coupling rod 3. In this case, the connecting tube 2 cannot be moved, as shown in FIGS. 3 and 4.

Figure 6:
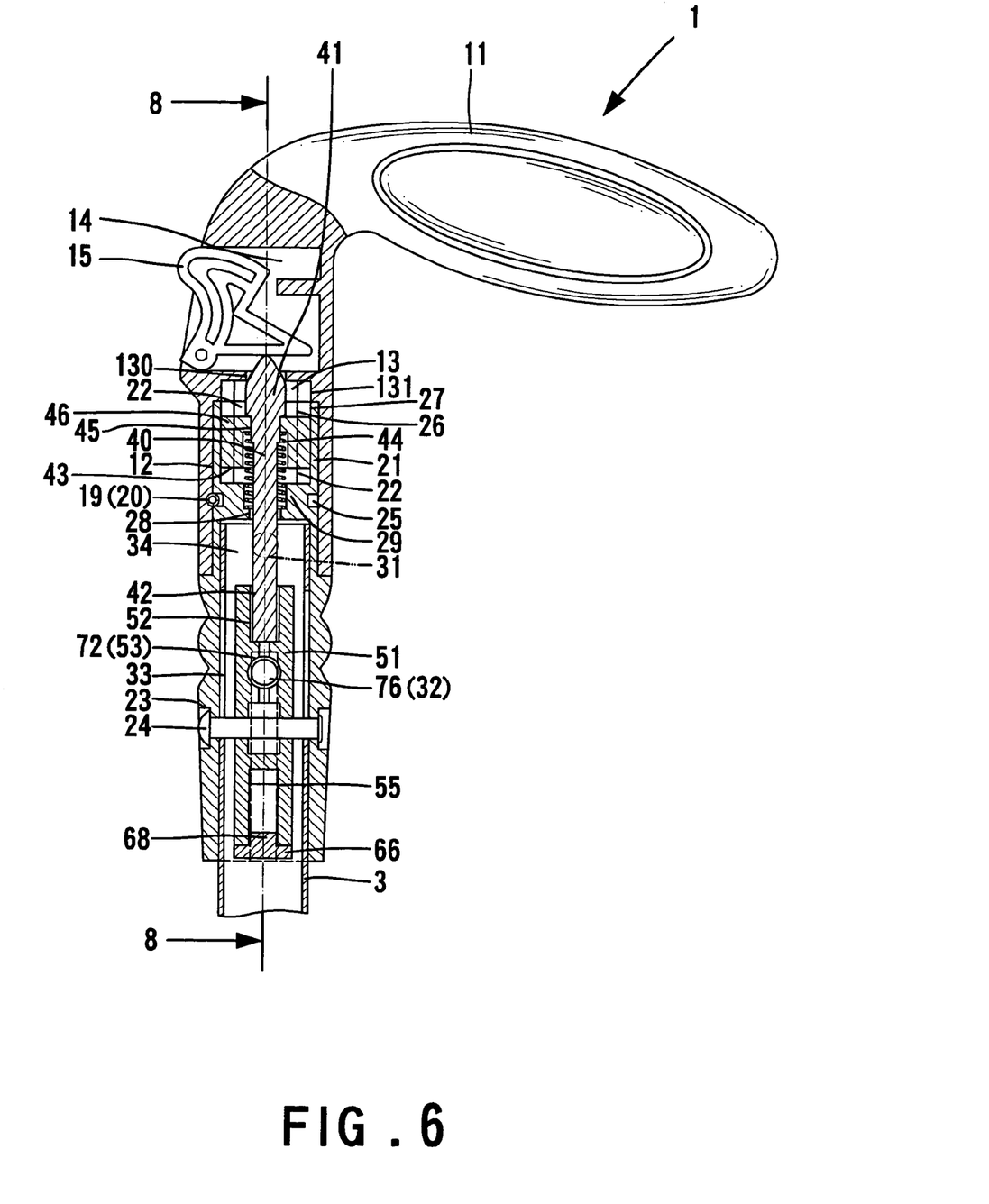
FIG. 6 is a sectional view similar to FIG. 3, wherein a button is pressed.
Figure 7:
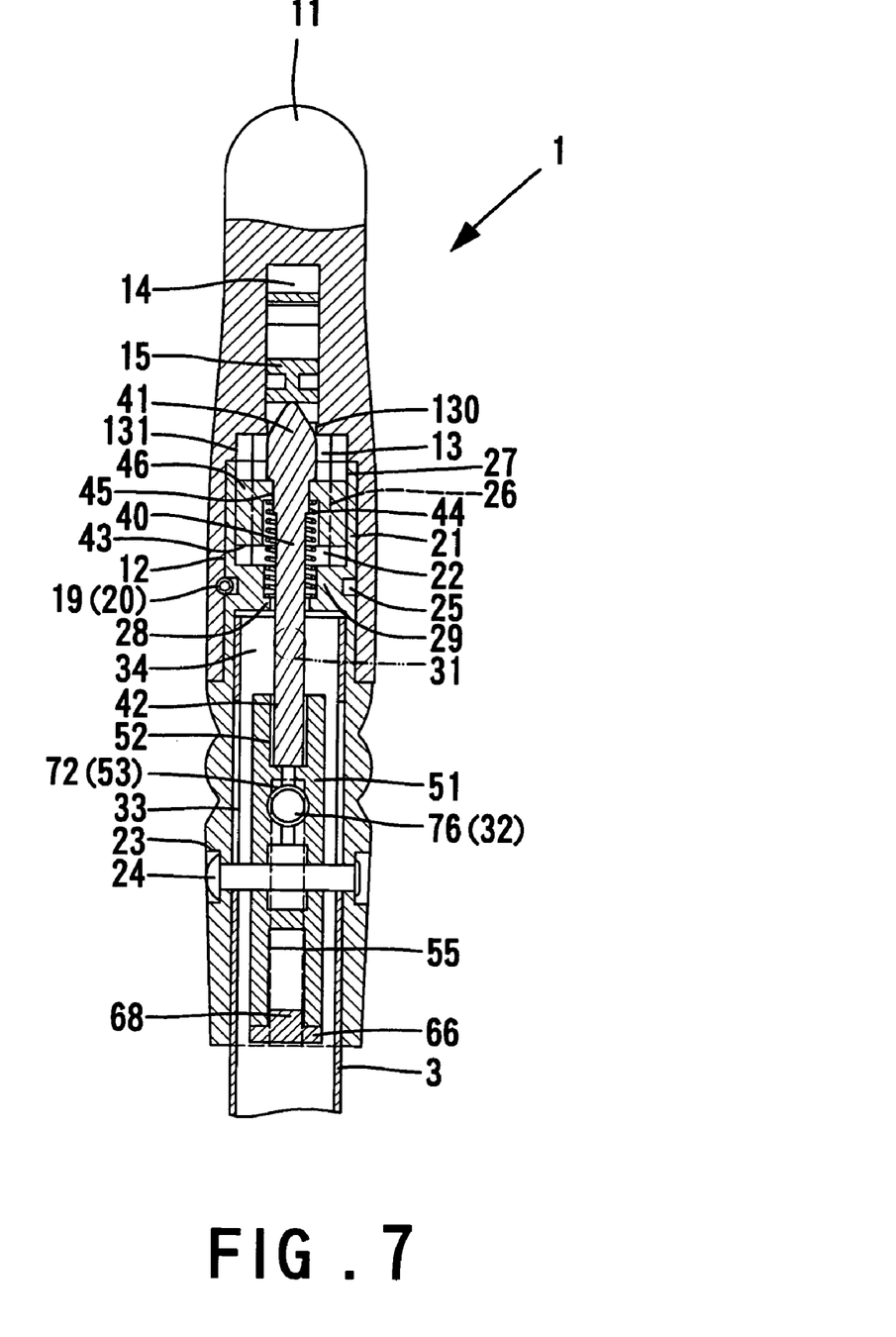
FIG. 7 is a sectional view similar to FIG. 6, wherein the handle is turned through 90 degrees when the button is pressed.

Referring to FIGS. 6 and 7, when the button 15 is pressed inward, the enlarged upper end 41 of the tappet 40 is pressed downward and compresses the elastic element 44. The clutch block 43 disengages from the cruciform groove 13 of the handle 1 yet still remains in the cruciform section 22 of the longitudinal hole 26 of the connecting member 2. In this state, the handle 1 can be turned until the handgrip 11 is in the desired orientation, as shown in FIG. 1. In this embodiment, the handgrip 11 may be located in one of four orientations. The number of orientations or positions of the handgrip 11 depends on the number of the radial grooves forming the groove 13, and the number of the radial extensions 46 and the number of the radial grooves 27 of the connecting tube 2 are changed accordingly.

Figure 8:
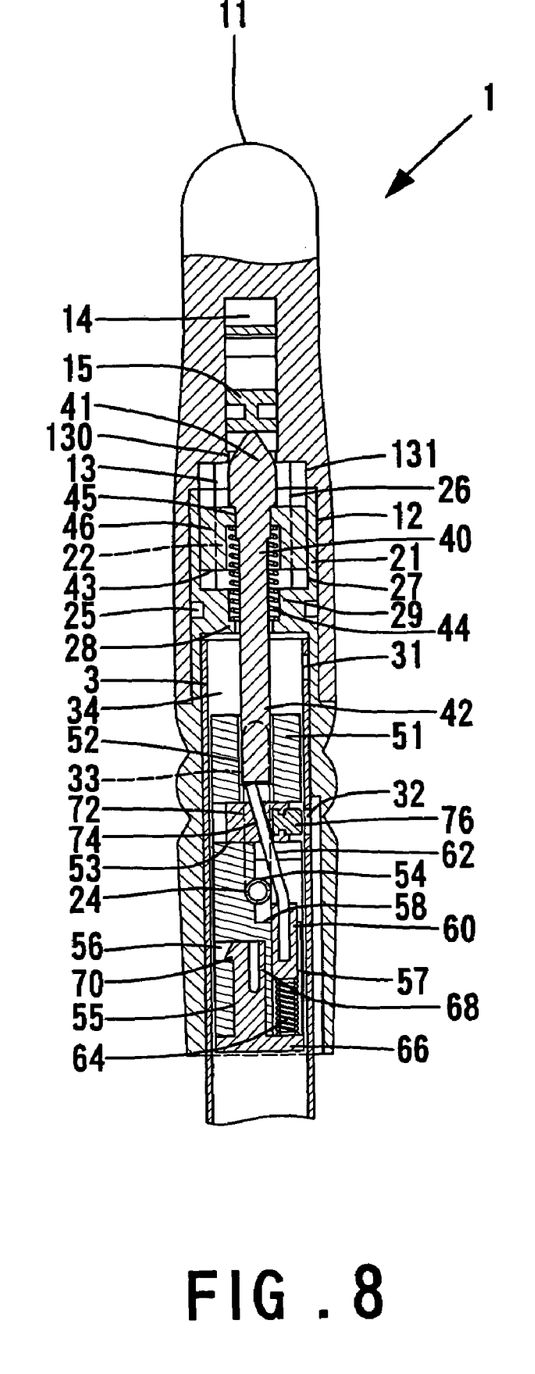
FIG. 8 is a sectional view taken along line 8—8 in FIG. 6.
Figure 9:
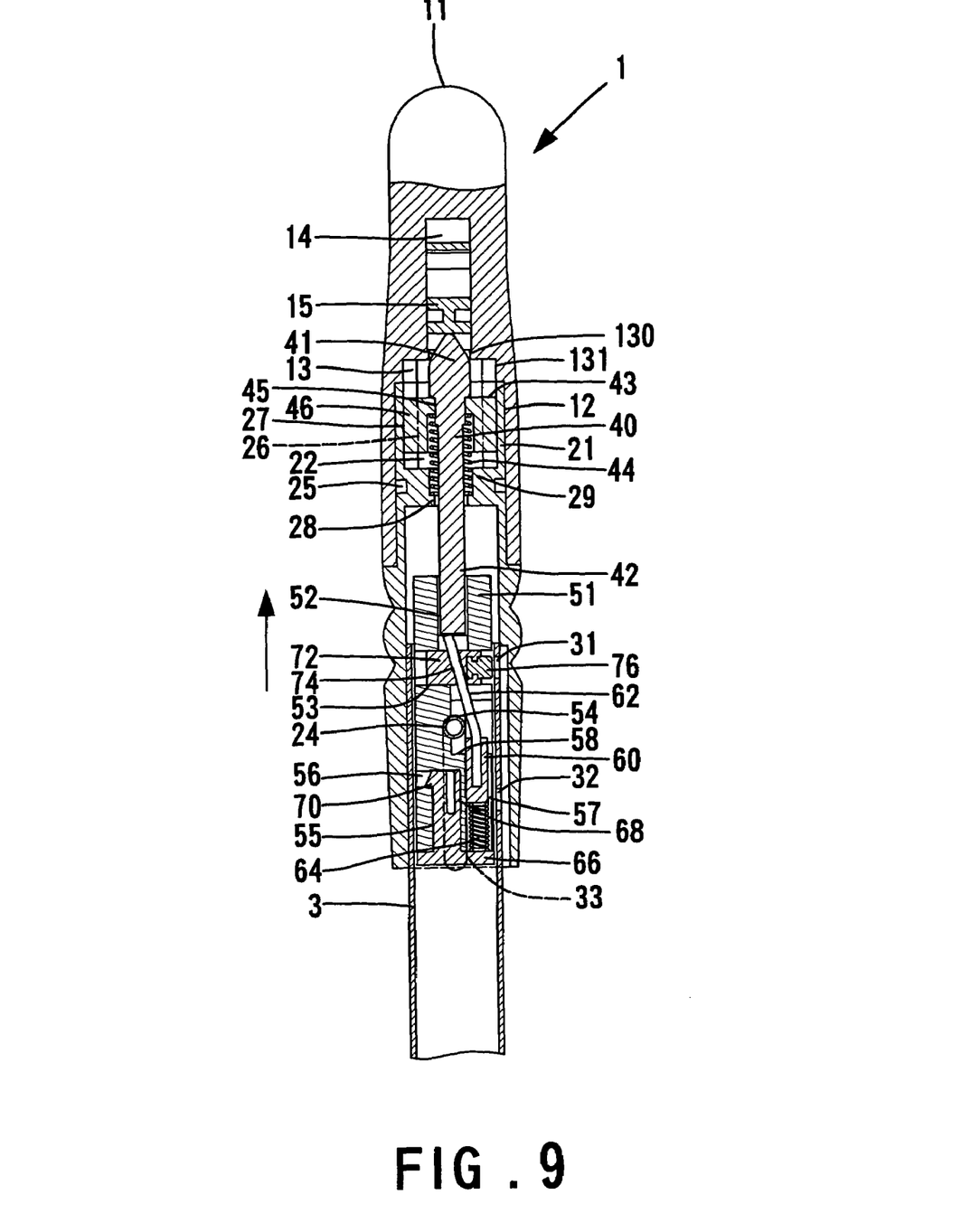
FIG. 9 is a sectional view similar to FIG. 8, wherein the handle is pulled upward to adjust the level of the handle.
Figure 10:
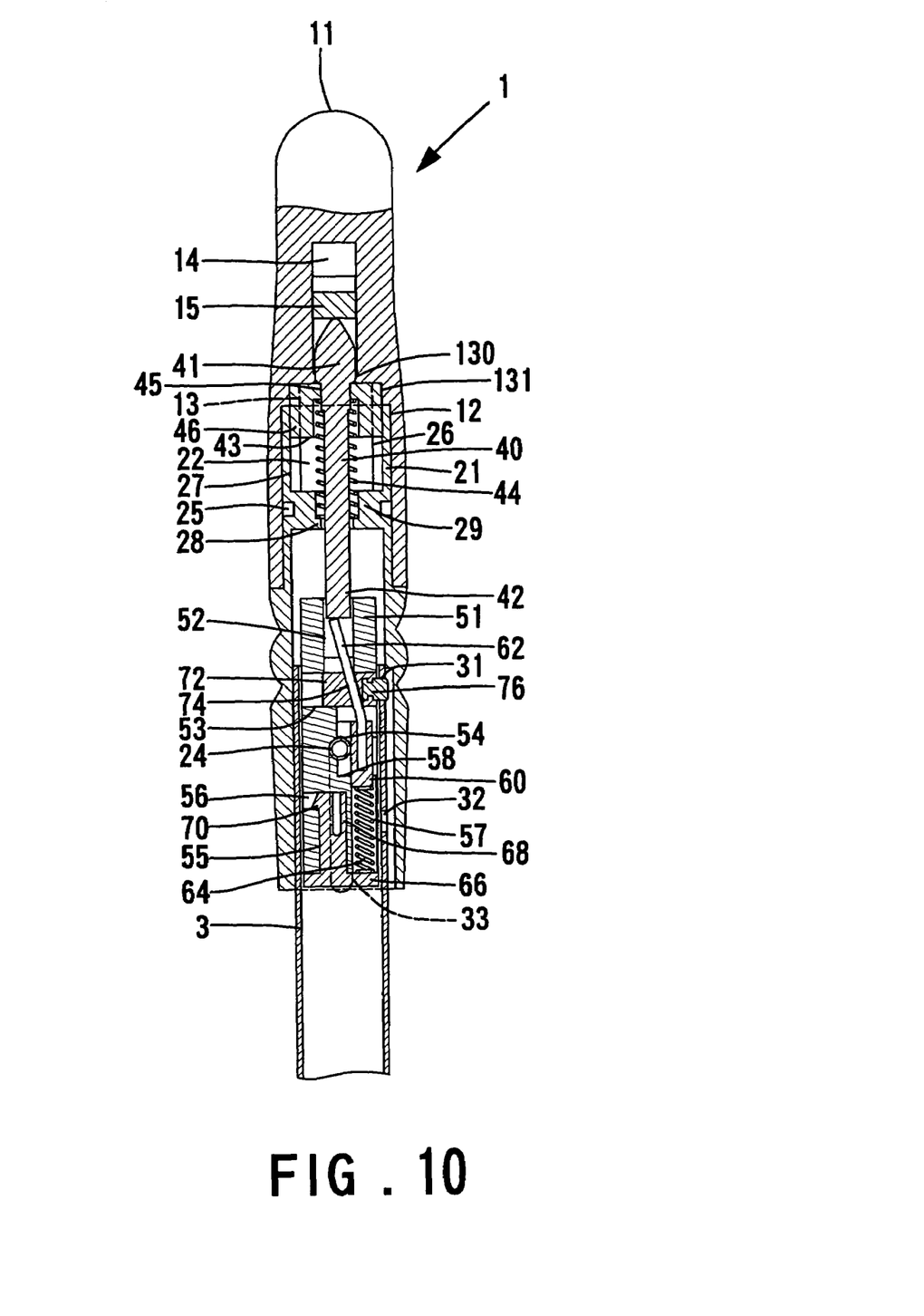
FIG. 10 is a sectional view similar to FIG. 9, wherein the button is released.

Referring to FIGS. 6 and 8, when the button 15 is pressed inward, the lower end 42 of the tappet 40 pressed the inclined resilient extension rod 62 downward and inward, causing the sliding block 60 to slide downward and to compress the elastic element 64. Meanwhile, the positioning member 72 is moved away from the transverse positioning hole 32. Thus, the end 76 of the positioning member 72 disengages from the lower the transverse positioning hole 32. The user may pull the handle 1 upward (which causes joint upward movement of the connecting tube 2 and the main block 51) until the positioning member 72 is aligned with the other transverse positioning hole 31, as shown in FIG. 9. When the button 15 is released, the sliding block 60 and the inclined resilient extension rod 62 return their initial position under the action of the elastic element 64, which, in turn, urging the end 76 of the positioning member 72 into the other transverse positioning hole 31. The level of the handgrip 1 is thus adjusted. Further, the button 15, the tappet 40, and the clutch block 43 return their original position under the action of the elastic element 44.

The handle assembly 1 in accordance with the present invention can be used with a toy stroller, not limited to the stroller shown in the drawings.

Although a specific embodiment has been illustrated and described, numerous modifications and variations are still possible without departing from the essence of the invention. The scope of the invention is limited by the accompanying claims.

What is claimed is:

1. A handle assembly for coupling with each of two handle-coupling rods (3) of a stroller or a toy stroller, each said handle-coupling rod (3) comprising an upper end including at least two vertically spaced transverse positioning holes (31 and 32), the handle assembly comprising:

a connecting tube (2) including an upper end (21) and a lower end that receives an associated one of the handle-coupling rods (3), allowing the connecting tube (2) to move relative to the associated handle-coupling rod along a longitudinal direction of the connecting tube (2), the connecting tube (2) including a longitudinal hole (26) and at least two radial grooves (27) defined in an upper inner periphery delimiting the longitudinal hole (26);

a handle (1) comprising a first end and a second end, a compartment (12) being defined in the first end of the handle (1), a handgrip (11) being formed on the second end of the handle (1), a hole (130) being defined in an upper end wall delimiting the compartment (12), at least two radial grooves (131) being defined in an inner periphery delimiting the hole (130), the handle (1) further including a transverse groove (14) communicated with the hole (130), a button (15) being pivotally received in the transverse groove (14), the upper end (21) of the connecting tube (2) being received in the compartment (12) of the handle (1);

a clutch block (43) received in the upper end (21) of the longitudinal hole (26) of the connecting tube (2), the clutch block (43) including at least two radial extensions (46) extending from an outer periphery thereof, the clutch block (43) further including a longitudinal hole (45);

a first elastic element (44) mounted in the upper end (21) of the connecting tube (2) for biasing the clutch block (43) to a position where said at least two radial extensions (46) are partially received in said at least two radial grooves (131) of the handle (1) and partially received in said at least two radial grooves (27) of the connecting tube (2), allowing joint longitudinal movement of the connecting tube (2) and the handle (1);

a tappet (40) extending through the longitudinal hole (45) of the clutch block (43), the tappet (40) including an upper end (41) abutting against the button (15) and a lower end (42);

a main block (51) mounted in the upper end of the associated handle-coupling rod (3), the main block (51) including an upper longitudinal hole (52), a transverse hole (53) below the upper longitudinal hole (52) and communicated with the upper longitudinal hole, a lower longitudinal hole (57) not aligned with the upper longitudinal hole (52), and a compartment (58) between the lower longitudinal hole (57) and the transverse hole (53);

a positioning member (72) slidably received in the transverse hole (53), the positioning member (72) including an inclined transverse through-hole (74);

a sliding block (60) slidably received in the compartment (58) of the main block (51), the sliding block (60) including an inclined resilient extension rod (62) extending through the inclined transverse through-hole (74) of the positioning member (72) into the upper longitudinal hole (52) of the main block (51), the lower end of the tappet (40) extending into the upper longitudinal hole (52) of the main block (51) and abutting against the inclined resilient extension rod (62); and a second elastic element (64) mounted in the lower longitudinal hole (57) of the main block (51) for biasing the sliding block (60) to a position that urges an end (76) of the positioning member (72) into one of said at least one transverse positioning holes (31 and 32) of the associated handle-coupling rod (3);

wherein when the button (15) is pressed, the clutch block (43) slides longitudinally such that said at least two radial extensions (46) of the clutch block (43) are disengaged from said at least two radial grooves (131) of the handle (1) to allow the handle (1) to turn relative to the connecting tube (2) to a desired orientation and that the inclined resilient extension rod (62) is pressed downward and inward to cause the sliding block (60) to slide downward and to cause the end (76) of the positioning member (72) to disengage from the transverse positioning holes (31 and 32), allowing the handle (1), the connecting tube (2), and the main block (51) to move along the longitudinal direction of the connecting tube (2).

2. The handle assembly as claimed in claim 1, with the upper end of each said handle-coupling rod (3) including a pair of aligned longitudinal slots (33) and with a pin (24) transversely extending through the connecting tube (2) and the longitudinal slots (33) for guiding longitudinal movement of the tubular tube (2).

3. The handle assembly as claimed in claim 2, with the main block (51) including a transverse hole (54) through which the pin (24) extends, allowing joint longitudinal movement of the main block (51) and the connecting tube (2).

4. The handle assembly as claimed in claim 1, with the connecting tube (2) including an inner flange (29) through which the tappet (40) extends, the inner flange (29) including a necked portion (28), with the first elastic element (44) including a lower end abutting against the necked portion (28) and an upper end abutting against an end wall of the clutch block (43).

5. The handle assembly as claimed in claim 1, with the handle assembly further including an end cap (66) attached to a lower end of the main block (51), with the second elastic element (64) including an upper end abutting against the sliding block (60) and a lower end abutting against the end cap (66).

* * * * *